United States Patent [19]
Sato

[11] Patent Number: 5,784,000
[45] Date of Patent: Jul. 21, 1998

[54] RADIO SELECTIVE CALLING SYSTEM

[75] Inventor: Yukio Sato, Shizuoka, Japan

[73] Assignee: NEC Corporation, Tokyo, Japan

[21] Appl. No.: 699,992

[22] Filed: Aug. 20, 1996

[30] Foreign Application Priority Data

Aug. 21, 1995 [JP] Japan .................. 7-211601

[51] Int. Cl.$^6$ .................. H04Q 9/00; G08B 5/22
[52] U.S. Cl. .................. 340/825.44; 340/825.47; 340/825.52; 340/311.1; 455/31.1; 455/31.2; 455/38.1; 455/39; 370/310; 370/312; 370/313; 370/314
[58] Field of Search .................. 340/825.44, 311.1, 340/825.47, 825.52; 455/31.2, 38.1, 39, 31.1; 379/56.1; 370/310, 312, 313, 314

[56] References Cited

U.S. PATENT DOCUMENTS

| | | | |
|---|---|---|---|
| 4,369,443 | 1/1983 | Giallanza et al. | 340/825.47 |
| 4,599,615 | 7/1986 | Umetsu | 340/825.44 |
| 4,661,972 | 4/1987 | Kai | 379/57 |
| 4,682,148 | 7/1987 | Ichikawa et al. | 340/311.1 |
| 4,766,434 | 8/1988 | Matai et al. | 340/825.44 |
| 4,779,091 | 10/1988 | Oyagi et al. | 340/825.44 |
| 4,940,975 | 7/1990 | Ide et al. | 340/825.44 |
| 4,949,085 | 8/1990 | Fisch et al. | 340/825.44 |
| 5,363,090 | 11/1994 | Cannon et al. | 340/825.44 |
| 5,450,071 | 9/1995 | DeLuca et al. | 340/825.44 |

FOREIGN PATENT DOCUMENTS 63-227137  9/1988  Japan.

*Primary Examiner*—Michael Horabik
*Assistant Examiner*—Yonel Beaulieu
*Attorney, Agent, or Firm*—Young & Thompson

[57] ABSTRACT

In a selective calling receiver receiving a first message from a transmitting side, a plurality of selective calling signals including messages and linkage orders of the messages, respectively, are sequentially received, and the messages and the linkage orders are stored into a first memory until a selective calling signal including a terminal linkage order is received. When the linkage orders stored in the first memory are numbered consecutively from a predetermined beginning linkage order to the terminal linkage order, the messages are sorted according to the linkage orders stored in the first memory to produce a second message when the linkage orders stored in the first memory are numbered consecutively. And the second message is stored as the first message received from the transmitting side into a second memory.

20 Claims, 4 Drawing Sheets

FIG. 3

TEMPORARY MESSAGE AREA

|  | MESSAGE DATA | MLI | MLO |
|---|---|---|---|
| $MSG_1$ | 0 0 0 0 0 ($D_1$) | [ | 1 |
| $MSG_2$ | 1 1 1 1 1 ($D_2$) | [ | 2 |
| ⋮ | ⋮ | ⋮ | ⋮ |
| $MSG_N$ | 3 3 3 3 3 ($D_N$) | ] | N |
| $MSG_{N-1}$ | 4 4 4 4 4 ($D_{N-1}$) | [ | N−1 |

FIG. 4

ENTIRE MESSAGE AREA

| MESSAGE No. | ENTIRE MESSAGE |
|---|---|
| #1 | ($D_1$, $D_2$, $D_3$, ⋯, $D_{N-1}$, $D_N$)<br>0 0 0 0 0 1 1 1 1 1 ⋯ 4 4 4 4 4 3 3 3 3 3 |
| #2 | ×××××× |
| ⋮ | ⋮ |

# RADIO SELECTIVE CALLING SYSTEM

BACKGROUND OF THE INVENTION

1. Field of the invention

The present invention generally relates to a radio selective calling system and, in particular, to a radio selective calling receiver which receives a plurality of selective calling signals including messages to be combined into an entire message.

2. Description of the Related Art

A selective calling receiver has been widely used for various purposes and, especially, a small-sized and lightweight selective calling receiver called a pager is suitable for being taken on the road. A basic function of the selective calling receiver is to indicate by beep sound, vibration, or light the incoming call and then to inform the user of a received message, for example, displaying the received message on a liquid-crystal display (LCD) according to user's key operations.

Recently, there has been proposed a selective calling system which allows the transmission of a long message. More specifically, a long message is divided into a plurality of messages which are transmitted to a receiving side where they are combined into the original message.

Such a selective calling system has been disclosed in Japanese Patent Unexamined Publication No. 63-227137. According to this system, a message code following a calling code is divided into a plurality of submessage units each of which has a control code added at the end so as to be combined in order and is inserted into an idle time slot. In other words, one selective calling signal is transmitted with a long message divided into a plurality of submessage units. Therefore, this conventional system is not directed to a plurality of selective calling signals but only a single selective calling signal.

Another conventional system has been disclosed in Japanese Patent Unexamined Publication No. 4-286429. According to this conventional system, in the case where a plurality of selective calling signals have been received for a predetermined time period, all the received messages are stored into a RAM and then are sequentially displayed on screen after the predetermined time period has expired.

However, the user cannot read the received message until the predetermined time period has expired. Further, when at least one of the selective calling signals fails to be received or the selective calling signals get out of order, the entire message cannot be reproduced exactly, resulting in an incorrect message displayed on screen.

SUMMARY OF THE INVENTION

An object of the present invention is to provide a radio selective calling receiver and its receiving control method which enable receiving a long message with reliability.

Another object of the present invention is to provide a radio selective calling receiver and its receiving control method which enable receiving a plurality of selective calling signals to combine them into the original message with reliability.

According to the present invention, in a receiving side or a receiver receiving a first message from a transmitting side, a plurality of selective calling signals including messages and linkage orders of the messages, respectively, are sequentially received, and the messages and the linkage orders are stored into a first memory until a selective calling signal including a terminal linkage order is received. In the case where the linkage orders stored in the first memory are numbered consecutively from a predetermined beginning linkage order to the terminal linkage order, the messages are sorted according to the linkage orders stored in the first memory to produce a second message when the linkage orders stored in the first memory are numbered consecutively. And the second message is stored as the first message received from the transmitting side into a second memory.

Preferably, a user is informed of incompletion of the messages stored in the first memory when the linkage orders stored in the first memory are not numbered consecutively. Further, the sequential receiving of selective calling signals is repeated until the linkage orders stored in the first memory are numbered consecutively.

As described above, according to the present invention, an entire message is assembled from a plurality of received messages based on the linkage orders even when the selective calling signals have been received in an order different from a transmitting order. Further, when the linkage orders are numbered incompletely or some numbers are lacked, the user is informed of incompletion of the messages. Therefore, after receiving necessary messages, a complete message can be displayed on screen.

BRIEF DESCRIPTION OF THE DRAWINGS

FIG. 3 is a schematic diagram showing an example of the contents of a temporary message area in a message memory according to the embodiment;

FIG. 4 is a schematic diagram showing an example of the contents of an entire message area in the message memory.

DETAILED DESCRIPTION OF THE PREFERRED EMBODIMENTS

Figure 1:
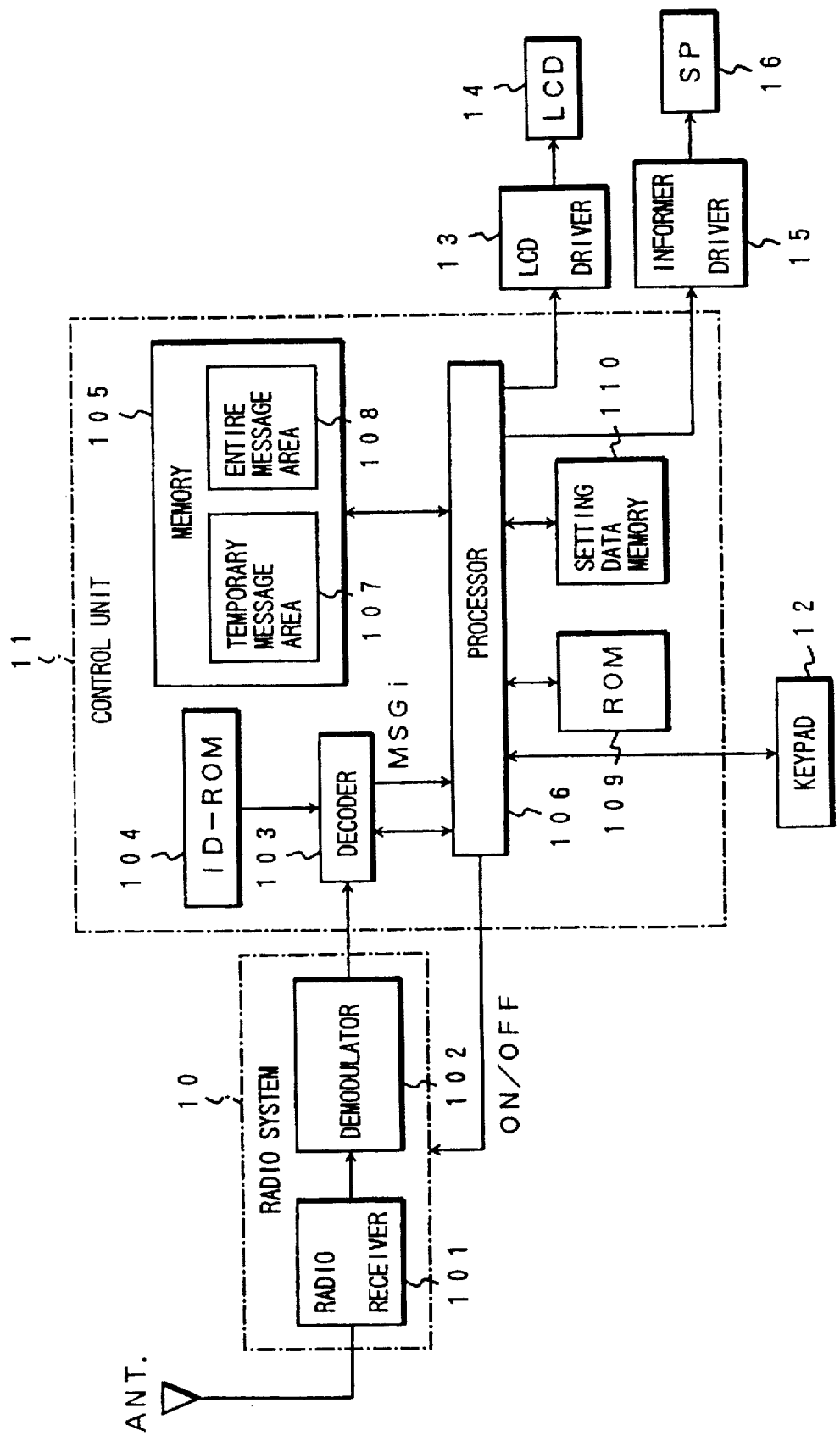
FIG. 1 is a block diagram showing a radio selective calling receiver according to an embodiment of the present invention.

Referring to FIG. 1, there is shown a selective calling receiver in accordance with the present invention. The selective calling receiver is comprised of a radio system 10, a control unit 11, a keypad 12 including a mode selector and other function keys, a driver 13 connected to a liquid-crystal display (LCD) 13, and a driver 15 connected to a speaker 16 or a vibrator. The radio system 10 is comprised of a built-in antenna and a radio receiver 101 which receives a digital-modulated radio signal from a radio base station (not shown) of a selective calling system through the antenna. The radio system 10 further includes a digital demodulator 102 which demodulates the received radio signal into a baseband signal. After the waveform of the baseband signal is shaped, the wave-shaped signal is transferred as a selective calling signal from the radio system 10 to the control unit 11. The selective calling signal has a linkage control code added at the end (see FIG. 2).

The control unit 11 includes a decoder circuit 103 which receives the selective calling signal from the radio system 10 and decodes it into received data. In this embodiment, the decoder circuit 103 further compares a selective calling number included in the received data with a predetermined identification (ID) number previously stored in an ID ROM 104. When the received selective calling number is identical to the stored ID number, a received message MSG of the received data is transferred from the decoder circuit 103 to a memory 105 by the processor 106 referring to the linkage control code of the received message. The memory 105 is formed with a random access memory (RAM) including a temporary message area 107 and an entire message area 108. As described later, the temporary message area 107 stores a plurality of messages which are to be combined to the original entire message. The entire message area 108 stores the combined entire message as well as an independent message having no linkage control code.

The processor 106 receives not only the received message MSG from the decoder circuit 103 but also user's instructions from the keypad 12. The processor 106 performs predetermined control operations including an intermittent ON/OFF receiving control and a message receiving control according to the operating program stored in a read-only memory (ROM) 109. Further, the message receiving control is performed using setting data stored in a setting data memory 110.

When an incoming call occurs, the processor 105 controls the informer driver 15 such that the speaker 16 is activated. Further, when receiving a read request from the keypad 12, the processor 103 reads the entire message from the entire message area 108 and then sends it to the LCD driver 13 to display it on the LCD 14. The entire message is formed by combining the received messages stored in the temporary message area 107 under the control of the processor 106 and then is transferred to the entire message area 108.

Figure 2:
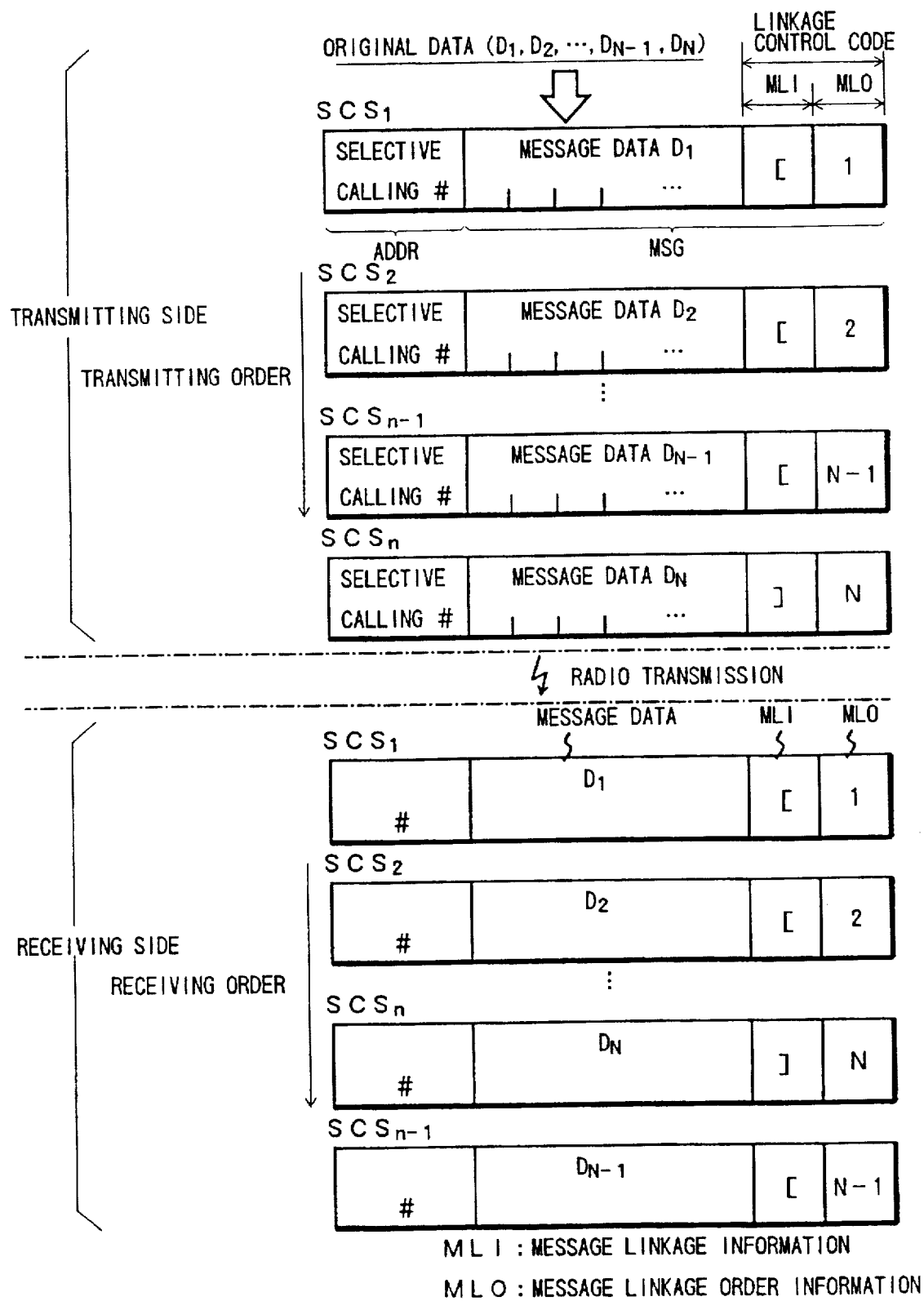
FIG. 2 is a schematic diagram showing the radio transmission of plural selective calling signals from a transmitting side to a receiving side where the received selective calling signals got out of order due to some radio noise or the likes.

As illustrated in FIG. 2, a selective calling signal is comprised of a synchronization signal (not shown), a selective calling number (calling address) ADDR, and a message MSG. Tn cases where a long message is transmitted according to the present invention, the message MSG is composed of a plurality of message data blocks followed by a linkage control code consisting of a message linkage information MLI and a message linkage order information MLO. The message linkage information MLI is one of a continuation MLI (for example "["), and a termination MLI (for example"]"). The continuation MLI "[" indicates that the message data included is to be followed by the subsequent message and the termination MLI "]" indicates that the message data included is the last part of the message. The message linkage order information MLO may use a consecutive sequence of numbers to indicate the order of the message data included. The message linkage information MLI "[" and "]" are previously stored in the setting data memory 110 in order to be compared with that of the received message MSG.

Referring to FIG. 2, a transmitting side transmits a plurality of selective calling signals $SCS_1$–$SCS_N$ (N is an integer) in this order to a receiving side or a selective calling receiver. Each of the selective calling signals is transmitted two or more times for improved reliability. Therefore, when radio noises or the likes occur, there may be cases where a first selective calling signal fails to be received but the subsequent one is successfully received. This may result in that the selective calling signals are received in a different order: for example, $SCS_1$, $SCS_2$, ..., $SCS_N$, and $SCS_{N-}$. As described later, the message data $D_1$–$D_1$ received in a different order are sorted based on the message linkage information MLI and the message linkage order information MLO into an original entire message.

Referring to FIG. 3, N messages MSGs received in a different order ($MSG_1$, $MSG_2$, ... $MSG_N$, and $MSG_{N-}$) are stored in the same order onto the temporary message area 107 of the memory 105 because each MSGs has the message linkage information MLI added at the end.

Figure 5:
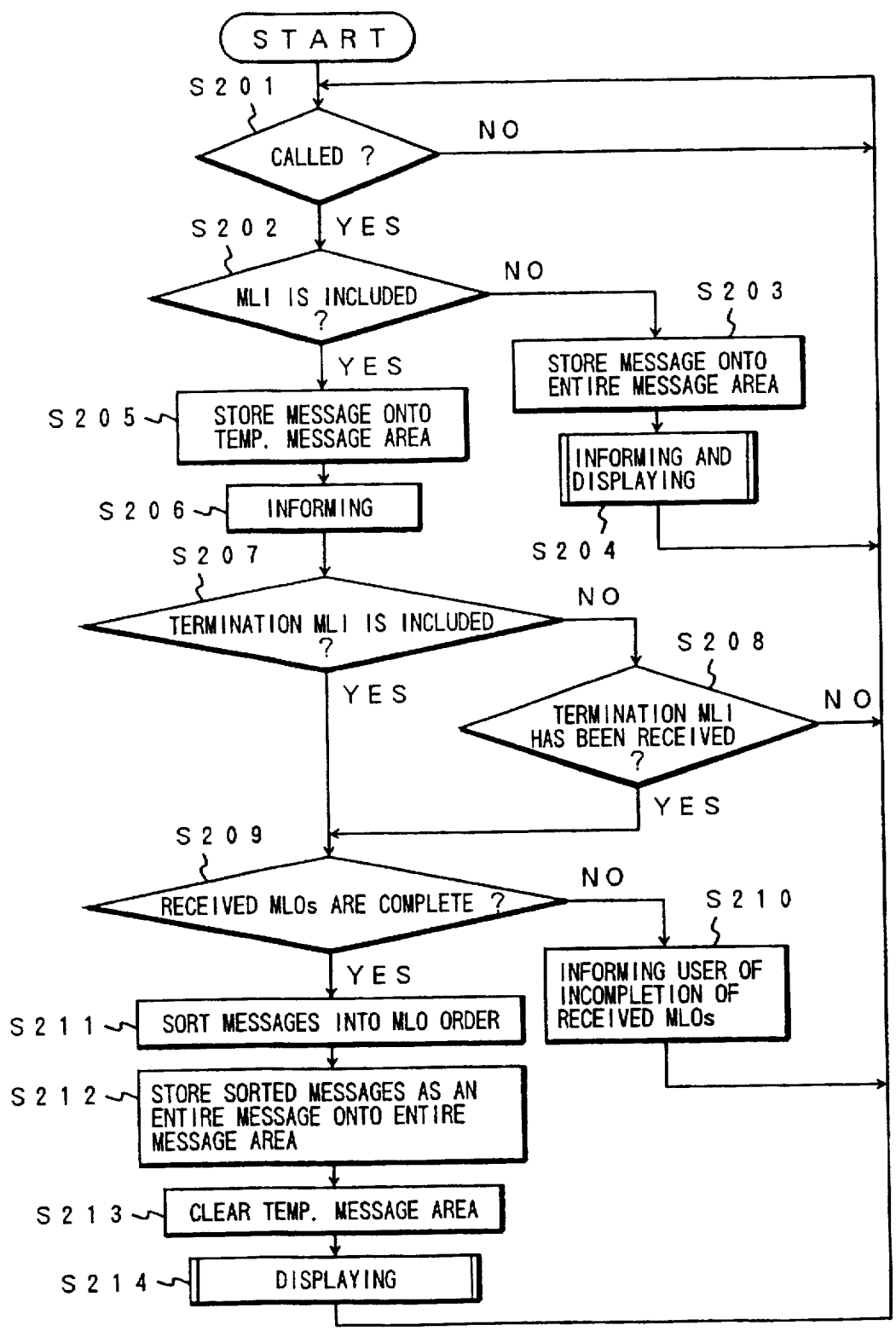
FIG. 5 is a flowchart showing an embodiment of a receiving control method according to the present invention.

Referring to FIG. 4, the messages data ($D_1$, $D_2$, ... $D_N$, and $D_{N-}$) stored in the temporary message area 107 are sorted and combined to an entire message ($D_1+D_2+...+D_{N-}+D_N$) under the control of the processor 106 as shown in FIG. 5. The entiremessage is stored in the entire message area 108 and then is displayed on the LCD 14 according to the user's key operation.

PROCESSING RECEIVED MESSAGES

As shown in FIG. 5, when an incoming call occurs (YES in step S201), the processor 106 checks whether the received message $D_1$ has the message linkage information MLI (step S202). When the message linkage information MLI is not included (NO in step S202), the received message $MSG_i$ is stored onto the entire message area 108 of the memory 105 because the received message $MSd_i$ is complete (step S203). Subsequently, the processor 106 controls the LDC driver 13 and the informer driver 15 such that the speaker 16 makes a beep to inform the user of the incoming call and the received message $D_i$ is displayed on the LCD 14 (step S204).

When the message linkage information MLI is included in the received message MSG, as shown FIGS. 2 and 3 (YES in step S202), the received message $MSG_i$ is stored onto the temporary message area 107 of the memory 105 because the received message data $D_i$ should be followed by next message data $Di_{i+1}$ (step S205). After the processor 106 controls the informer driver 15 such that the speaker 16 makes a beep to inform the user of the incoming call (Step S206), the processor 106 checks whether the message linkage information MLI included in the received message $D_i$ is the termination MLI "]" (step S207). When the message linkage information MLI is not the termination MLI "]" (NO in step S207), the processor 106 further checks whether the termination MLI "]" has been received by searching the temporary message area 107 (step S208). When the termination MLI "]" has never been received (NO in step S208), control returns to the step S201 where the processor 106 is waiting for a next incoming call.

When the termination MLI "]" has been received or when the message linkage information MLI included in the received message $D_i$ is the termination MLI "]" (YES in steps S207 and S208), the processor 106 checks whether the message linkage order information MLO is numbered consecutively in the received messages stored in the temporary message area 107 (step S209). When the message linkage order information MLO is numbered incompletely or some numbers are lacked (No in step S209), the processor 106 informs the user of incompletion of the message linkage order information MLO by using the LCD 14 and/or the speaker 16 (step S210) and then control returns to the step S201 where the processor 106 is waiting for a next incoming call.

When the message linkage order information MLO is numbered consecutively in the received massages $MSG_1$–$MSG_N$ (YES instep S209), the processor 106 reads the messages $MSG_1$–$MSG_N$ from the temporary message area 107 and sorts them according to the message linkage order information MLO (step S211). After sorting the received massages $MSG_1$–$MSG_N$ and deleting the message linkage information MLI and the message linkage order information MLO from the received massages $MSG_1$–$MSG_N$, the processor 106 combines the sorted message data $D_1$–$D_N$ to an entire message and then transfers the entire message to the entire message area 108 as shown in FIG. 4 (step S212). Subsequently, the processor 106 controls the LDC driver 13 such that the entire message is displayed on the LCD 14 (step S214).

In this manner, an entire message is assembled from a plurality of submessages $MSG_1$–$MSG_N$ based on the message linkage information MLI and the message linkage order information MLO even when the selective calling signals have been received in an order different from the transmission order. Further, when the message linkage order information MLO is numbered incompletely or some numbers are lacked, the processor 106 informs the user of incompletion of the message linkage order information MLO through the LCD 14 or speaker 16. Therefore, after receiving necessary messages, a complete message can be displayed on screen.

What is claimed is:

1. A method for receiving a plurality of selective calling signals including messages from a transmitting side, comprising the steps of:
   a) sequentially receiving said plurality of selective calling signals including messages and linkage orders of the messages, respectively, to store the messages and the linkage orders into a first memory until a selective calling signal including a terminal linkage order is received;
   b) checking whether the linkage orders stored in the first memory are numbered consecutively from a predetermined beginning linkage order to the terminal linkage order;
   c) sorting the messages according to the linkage orders stored in the first memory to produce a second message when the linkage orders stored in the first memory are numbered consecutively; and
   d) storing the second message as the first message received from the transmitting side into a second memory.

2. The method according to claim 1, wherein the step b) comprises the step of:
   informing a user of incompletion of the messages stored in the first memory when the linkage orders stored in the first memory are not numbered consecutively.

3. The method according to claim 2, wherein the step b) further comprises the step of:
   repeating the steps a) and b) until the linkage orders stored in the first memory are numbered consecutively.

4. The method according to claim 1, further comprising the step of:
   storing an entire message included in a selective calling signal including no linkage order into the second memory.

5. The method according to claim 1, further comprising the step of:
   displaying the second message stored in the second memory.

6. The method according to claim 4, further comprising the step of:
   displaying the entire message stored in the second memory.

7. A selective calling receiver for receiving a plurality of entire selective calling signals including messages from a transmitting side, comprising:
   receiving means for sequentially receiving said plurality of selective calling signals including messages and linkage orders of the messages, respectively;
   first storage means for storing the messages and the linkage orders until a selective calling signal including a terminal linkage order is received;
   second storage means for storing one of said entire messages to be displayed on screen; and
   control means for checking whether the linkage orders stored in the first storage means are numbered consecutively from a predetermined beginning linkage order to the terminal linkage order, sorting the messages according to the linkage orders stored in the first storage means to produce a second entire message when the linkage orders stored in the first storage means are numbered consecutively, and transferring the second entire message as the first entire message received from the transmitting side into the second storage means.

8. The selective calling receiver according to claim 7, further comprising:
   informing means for informing a user of incompletion of the messages stored in the first storage means when the linkage orders stored in the first storage means are not numbered consecutively.

9. The selective calling receiver according to claim 8, wherein the control means activates the receiving means and the informing means until the linkage orders stored in the first storage means are numbered consecutively.

10. The selective calling receiver according to claim 7, wherein the second storage means stores a third entire message included in a selective calling signal including no linkage order into the second storage means.

11. The selective calling receiver according to claim 7, further comprising:
    displaying means for displaying the second entire message stored in the second storage means.

12. The selective calling receiver according to claim 10, further comprising:
    displaying means for displaying the third message stored in the second storage means.

13. The method according to claim 1, wherein each of the selective calling signals further includes a termination code indicating the terminal linkage order.

14. The selective calling receiver according to claim 7, wherein each of the selective calling signals further includes a termination code indicating the terminal linkage order.

15. A communication method for transmitting a first message from a transmitting side to a receiving side through a plurality of selective calling signals, the method comprising the steps of:
    at the transmitting side,
       dividing the message into a plurality of submessages each having a message length which is not greater than a predetermined message length in a single selective calling signal; and
       sequentially transmitting selective calling signals conveying the submessages, respectively, in a predetermined order at least two times, each of the selective calling signals comprising a calling signal followed by a message signal which includes a submessage, a linkage signal, and a linkage order signal, wherein the linkage signal indicates either a linkage state such that the submessage is to be followed by another submessage or a termination state such that the submessage is to be terminated, and wherein the linkage order signal indicates an order of the submessage;
    at the receiving side,
       a) sequentially receiving said plurality of selective calling signals to store submessages, linkage signals, and linkage order signals of the selective calling signals into a first memory until a selective calling signal including the linkage signal of the terminal state is received;

b) checking whether the linkage order signals stored in the first memory are numbered consecutively from a predetermined beginning linkage order signal to the terminal linkage order signal;

c) sorting the submessages according to the linkage order signals stored in the first memory to produce a second message when the linkage order signals stored in the first memory are numbered consecutively; and d) storing the second message as the first message received from the transmitting side into a second memory.

16. The communication method according to claim 15, wherein the step b) comprises the step of:

informing a user of incompletion of the submessages stored in the first memory when the linkage order signals stored in the first memory are not numbered consecutively.

17. The communication method according to claim 16, wherein the step b) further comprises the step of:

repeating the steps a) and b) until the linkage order signals stored in the first memory are numbered consecutively.

18. The communication method according to claim 15, further comprising the step of:

storing an entire message included in a selective calling signal including no linkage signal into the second memory.

19. The communication method according to claim 15, further comprising the step of:

displaying the second message stored in the second memory.

20. The communication method according to claim 18, further comprising the step of:

displaying the entire message stored in the second memory.

* * * * *